Feb. 4, 1969   E. H. JONES   3,425,861
CONTINUOUS APPLICATION OF SUBSTANCES TO TRAVELLING MATERIALS
Filed July 26, 1965
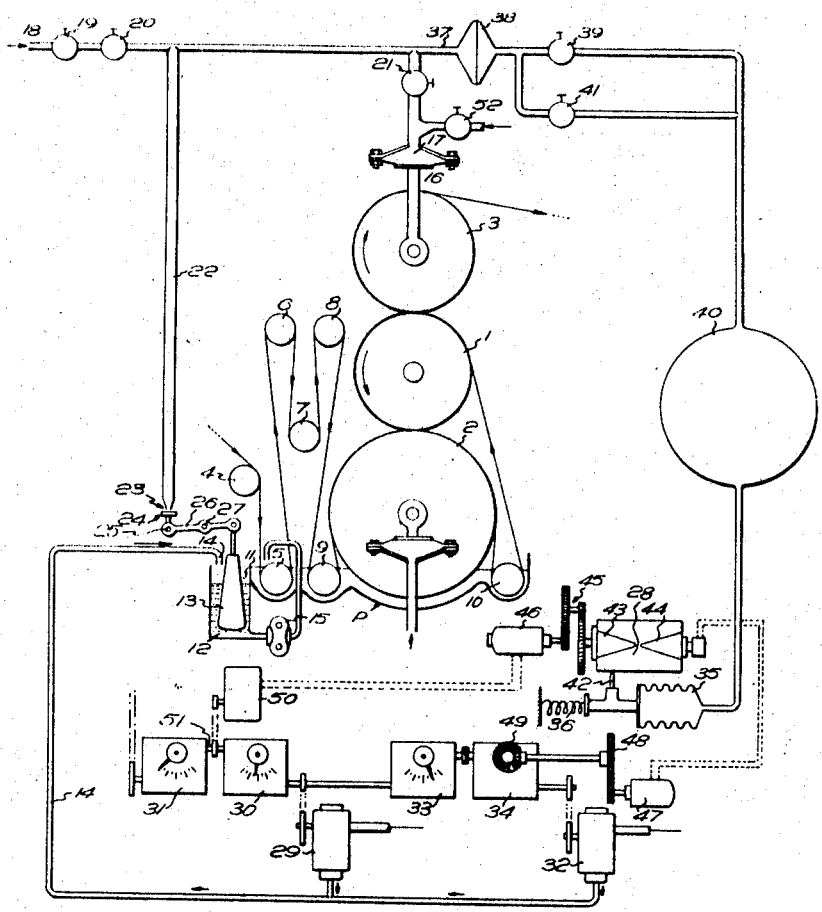
INVENTOR:
ERIC HARDING JONES
BY
Breitenfeld & Levine
Attorneys United States Patent Office 3,425,861
Patented Feb. 4, 1969

3,425,861
CONTINUOUS APPLICATION OF SUBSTANCES TO TRAVELLING MATERIALS
Eric Harding Jones, 30 Moss Lane, Bramhall, England
Filed July 26, 1965, Ser. No. 474,734
Claims priority, application Great Britain, July 27, 1964, 29,852/64
U.S. Cl. 117—102
Int. Cl. B05c 11/02
13 Claims

ABSTRACT OF THE DISCLOSURE

Liquid substance is applied to material by advancing the latter through an applicator system, which may include a reservoir containing the liquid, liquid being fed to the system at a prescribed rate. Changes in the amount of liquid in the system are detected, such as by a float, and the changes are used to vary effect of means, such as nip rollers, acting directly on the travelling material to correct for said changes. Long term variations in effect of direct-acting means, from a datum, e.g., departure of nip pressure from datum, are detected and used to alter the concentration of the liquid to correct for variations.

---

This invention concerns the continuous application of substances to travelling materials.

In certain continuous industrial processes, it is necessary to impregnate or to coat a running sheet of material with an additive substance in such a way that a prescribed amount of this substance is applied per unit area, length, or weight of the material. In such a process it is usual to pass the material through an "applicator," such as a bath equipped with a roller-nip, which applies the substance to the material for example as a solution, suspension, or melt.

Methods and means for automatically controlling the application of the substance in such processes are known, as for example those disclosed in several of our prior patents. Of these prior British patents, Nos. 654,178 and 830,836 may be referred to as both illustrating a general principle of control and respectively illustrating alternative methods of employing that principle.

The general principle is that of feeding the additive substance to the applicator system (which includes a reservoir) so that it arrives at the rate at which it is desired that it should be taken up by the travelling material, detecting changes in the rate of take-up indirectly by means of the consequent changes in the amount of liquid in the reservoir, and automatically influencing, in accordance with such detected changes, some factor affecting the take-up of the substance by the material in a way which opposes the detected change. In this way the material can be forced to take up the substance at an average rate which is equal to the desired rate, and if the characteristics of the system are properly selected good sensitivity can be achieved leading to accurate control.

In our prior British Patent No. 654,178 we have disclosed a system employing the principle set forth in which the factor affecting the rate of take-up is a property of the liquid in the applicator system (e.g. its concentration): whilst in our prior British Patent No. 830,836 we have disclosed a system employing the principle set forth in which the factor affecting the rate of take-up is a factor imposed by the machinery employed, namely the squeezing effect of a pair of nip rollers between which the material passes and forming part of the applicator system. Both types of system have advantages: thus, by using the concentration of the liquid for example as the variable factor a very flexible system is possible although the response rate is dependent on the total volume of liquid in the reservoir; on the other hand, when control is effected by varying the squeezing effect of a pair of nip rollers, a rapid response rate which is independent of the volume of liquid in the reservoir can be achieved, although the control range is rather narrow.

The present invention is based on the appreciation that it is possible to combine the two modes of control in an integrated control system, and with very advantageous results.

According to the present invention a method of continuously applying a prescribed amount of a substance per unit length of a travelling material, said substance being in liquid form or contained in a liquid, comprises supplying said liquid at a prescribed rate, corresponding to the prescribed rate of application of the substance, to an applicator system by which said liquid is applied to said travelling material, detecting any change in the amount of liquid in said applicator system which results from a deviation of the actual rate of application of the liquid from the prescribed rate of application thereof, utilizing such change to alter some factor affecting the take-up of liquid by the material imposed by the machinery employed and which has a rapid response rate in a sense and to an extent substantially to correct said deviation, detecting relatively long term departure of said factor from a datum, and utilizing any such departure to alter some property of the liquid which affects the rate of take-up thereof required by the material in a sense and to an extent substantially to eliminate said departure. Preferably said factor is the squeezing action of a pair of nip rollers, forming part of the applicator system and between which the material passes; and said property the concentration of said liquid.

Also according to the present invention apparatus for continuously applying a prescribed amount of a substance per unit length of a travelling material, said substance being in liquid form or contained in a liquid, comprises in combination an applicator system by which said liquid is applied to said travelling material, means for supplying said liquid at a prescribed rate, corresponding to the prescribed rate of application of the substance, to said applicator system, means for detecting any change in the amount of liquid in said applicator system which results from a deviation of the actual rate of application of the liquid from the prescribed rate of application thereof, means for utilizing such change to alter some factor affecting the take-up of liquid by the material imposed by the machinery employed and which has a rapid response rate, in a sense and to an extent substantially to correct said deviation, means for detecting relatively long term departure of said factor from a datum and means for utilizing any such departure to alter some property of the liquid which affects the rate of take-up thereof required by the material in a sense and to an extent substantially to eliminate said departure. Preferably said factor is the squeezing action of a pair of nip rollers, forming part of the applicator system and between which the material passes, and said property is the concentration of said liquid.

The invention will now be described further by way of example with reference to the accompanying diagram of an automatic pad box arrangement for impregnating textile fabric with liquor.

The pad box consists essentially of a mangle and roller system whereby the fabric or cloth is progressed; the pad box itself; means for controlling the squeezing effect of two mangle bowls between which the fabric passes; and means for controlling the concentration of the liquid in the pad box.

The mangle has three bowls, a middle driven bowl 1 with fixed bearings, a lower bowl 2 to which any desired upward thrust can be applied, pneumatically or otherwise (the actual means not being shown in full), and an upper bowl 3 which, with the middle bowl 1, provides a controlling nip, the squeezing effect of which is governed by pneumatic pressure which is automatically regulated as required to give a controlled take up of liquor by the cloth as it emerges from the mangle. Three immersion rollers and four guide rollers for the cloth are also provided. A long period of immersion is thus ensured before the cloth enters the main nip between bowls 1 and 2 and this is followed by a second immersion before the cloth passes through the controlling nip between bowls 1 and 3. The track of the cloth to fulfill these conditions is shown in the diagram. After passing over a guide roller 4, the cloth receives a preliminary immersion by passing under a roller 5. It then traverses rollers 6, 7 and 8 which are positioned so as to give a long period of contact of the cloth with the liquor taken up during the first immersion and before the cloth receives its second immersion at roller 9 from which it passes directly to the main mangle nip. After mangling, the cloth is again immersed—this time on the opposite side of the bottom bowl 2, by passing round roller 10. From here the cloth is taken through the upper and controlling nip where it receives its final squeeze before leaving the mangle.

The pad box P is designed to have a reasonably small capacity and, to achieve this, the depth of liquor is kept low and the profile of the bottom of the box is made to follow as closely as possible that of the immersion rollers 9, 10 and the lower bowl 2. The level of liquid in the box is kept constant by means of a narrow weir 11 fitted into the middle of the side of the box at which the cloth enters. This weir delivers liquor into a control box 12 having a small area of cross-section and containing a float 13. Stock liquor and diluent (when and as required) enter the box through a common pipe 14. A constant circulation of liquor from the control box 12 into the pad box itself is maintained by a gear-pump 15.

The pressure on the controlling nip is produced by diaphragms 16 mounted below chambers 17 and pressing onto the bearings of bowl 3. These chambers 17 are fed with a supply of compressed air which enters the system through the pipe 18 by way of cock 19, needle valve 20, and cock 21. The pressure in the chamber 17 is the same as in the pipe 22 which terminates in an orifice 23 and which can be closed by a horizontal plate 24 pivoted at 25 at one end of a lever 26 pivoted at 27. The other end of the lever supports the float 13.

In describing the action of the nip controller, it will be assumed that liquor of a definite concentration is being delivered through the pipe 14 and that the rate of delivery is the rate at which it is desired that the liquor should be taken up by the cloth in applying the specified percentage of finishing substance. If the correct percentage is being applied, there will be no change in depth of liquor in the control box 12 and the downward force of the float will be just sufficient to balance the force on the plate 24 due to the pressure of the air at the orifice 23. There is thus a definite relation between the level in the control box 12 and the pressure at the orifice 23 which, in turn, is related to the pressure at the controlling nip. If the take up of liquor falls below that required, the level in the control box 12 will rise, the downward force of the float 13 will decrease and this will cause the nip pressure between bowls 1 and 3 to fall until there is again no change in level in the control box 12. The cross-section of the float varies in such manner as to provide an approximately linear relationship between the volume of liquor in the control box 12 and the take up imposed by the controlling nip.

The above system, which can be made to provide a rapid but stable response to changes in take up, should deal adequately with the rapid piece-to-piece variations in take up, provided that liquor is fed to the system at such a concentration that, under average take up conditions, the take up is near to the middle of the range provided by the controlling nip. If this condition does not obtain, there is the likelihood that either the upper or lower limit of pressure regulation provided by the nip controller would be reached and the control system would therefore become inoperative. To prevent this condition from occurring an overriding control is provided which will steadily adjust the concentration of the inflowing liquor in such a way as to keep the average controlling nip pressure—taken over a prescribed (fairly long) time—near to the value required to impose a take up near to the middle of the range catered for by the controlling nip.

There is another requirement which has to be met in relation to liquor dilution—that is, the provision of means for metering not only the correct percentage of finishing ingredients from a stock liquor of standard concentration but also means for ensuring that this liquor is normally continuously diluted by a basic amount of diluent so that its basic concentration is near to that required in the box. The overriding dilution controller will then operate on the rate of delivery of basic diluent so as to introduce, in effect, an auxiliary supply.

The arrangements for setting the control to apply the right percentage of finish for various weights of cloth and to add basic diluent are shown in the diagram. It is assumed that the same highly-concentrated standard stock liquor is prepared for all cloths. A metering pump 29, for metering the stock liquor, is driven from a rotating member of the machine through P.I.V. gears 30 and 31 calibrated respectively in the percentage of finish to be applied and the cloth weight per unit length. This liquor is delivered to the box through the pipe 14 and is normally diluted, whilst still in the pipe, by a supply of basic and auxiliary diluent supplied through a metering pump 32. This pump is driven through two additional P.I.V. gears 33 and 34, connected in series, the first one being driven from the output shaft of gear 30. The outflow from the pump 32 is also delivered into the pipe 14. The quantity of basic diluent is predetermined by setting the gear 33 and the quantity of auxiliary diluent (positive or negative) is controlled by adjusting the setting of gear 34 by the overriding control. The average pressure being applied by the controlling nip over a predetermined period of time is determined by the degree of extension of a bellows 35 working against the compression spring 36. The characteristics of this bellows-spring combination are such that the full movement of the bellows corresponds to the total operable range in pressure at the controlling nip. Air is fed to the bellows through a pipe 37 followed by a filter 38 and a needle-valve or adjustable constriction 39, which can be set to offer considerable resistance to air-flow. The pipe leading to the bellows contains a damping chamber 40 which, working in conjunction with the constriction, damps out the more rapid fluctuations of pressure occurring at the pressure chamber 17 which applies pressure to the controlling nip. The constriction can be short-circuited, if desired, by a by-pass cock 41. The degree of extension of the bellows determines the position of a carbon brush 42 along a cylindrical drum 28. This drum is made of electrically insulating material into which are set two conducting curved triangular contacting plates 43 and 44, the outer surfaces of which are flush with the surface of the insulating material of the drum. The drum is supported on a shaft which can be driven, through appropriate gearing 45, by a motor 46. A reversible motor 47 drives the ratio-setting knob of the P.I.V. gear 34 through a reduction gear 48 and a bevel gear 49. A gearbox 50 incorporating a periodic switching arrangement (not shown) for the motor 46 is driven from the output shaft 51 of the P.I.V. gear 31 thus ensuring that the frequency of operation of the switch is proportional to the product of the machine speed and the linear density of the cloth, i.e. approximately proportional to the rate of removal of liquor from the pad box P. This is a condition appropriate for a control of this type. When the motor 46 is set in motion by the switch in gearbox 50 it rotates the drum 28 through one complete revolution. The motor then automatically stops until it is set in motion again by the switching arrangement in the gear-box 50. (The electrical circuit for achieving this type of motion is not shown in the diagram as it is of a well-known type.) While the drum 28 is revolving, the brush 42 either makes contact for a period with one of the triangular contacting plates 43 and 44, or, if the brush happens to be in a position midway along the drum, it passes between the contacting plates without making contact with either plate. While the brush is moving over plate 43, the motor 47 is switched on to drive the bevel gear 49 on the speed ratio adjuster of the P.I.V. gear 34, the direction of rotation of the adjuster being such that the rate at which diluent is metered into the system by the metering pump 32 is increased. If the brush is in such a position as to contact plate 44 as the drum revolves, the bevel gear is rotated in the opposite direction thereby reducing the rate of delivery of diluent by the metering pump.

Since the displacement of the brush 42 on either side of its middle position is a measure of the deviation in pressure at the controlling nip from its mid-value, it is clear that the arrangement just described for adjusting the flow of auxiliary diluent gives a periodic adjusting impulse the duration of which is proportional to the deviation and the direction of which is in the right sense to tend to restore the pressure at the nip to its mid-value by changing the rate of delivery of diluted liquor to the system. The best period to adopt between successive impulses will normally be found experimentally by changing the speed ratios in gear-box 50 but a fairly good estimate of this requirement can be calculated from the nip expression of the mangle and the take up characteristics of the types of cloth usually processed. The precise degree of damping of the overriding control will need to be determined by experiment; it will obviously have to be considerable to allow the controlling nip to deal with rapid take up changes undetected by the overriding control.

In using the system, the box is filled initially with a liquor diluted to an extent which is estimated to provide the appropriate concentration to put on the desired percentage of finishing substance when the control nip is applying a pressure corresponding to a take up of liquor about half-way along the range. The amount of liquid in the box is then carefully adjusted so that the float also takes up its intermediate position. The nip controller and overriding control are then brought into action.

The terms "liquid" and "liquor" as used in the appended claims are each intended to include within its scope any solution, suspension or melt of the additive substance.

The following variations may be provided for:

(a) Use of only the dilution controller to control take up. (This might be necessary, for example, when applying filling to previously washed, and often damp, fabrics.) To do this, the constriction 39 would be short-circuited by means of the by-pass valve 41 and a suitable fixed pressure would be applied to the controlling nip by closing the cock 21 and opening the cock 52. Under these conditions the extension of the bellows would be related to the force on the float 13 and hence the rate of supply of diluent would be controlled directly by the level of liquor in the control box.

(b) Use of the nip controller only. To do this, means would have to be provided for setting the P.I.V. gear 34 by hand and disconnecting the pilot-motor 47.

I claim:
1. A method of continuously applying a prescribed amount of a substance per unit length of a travelling material, said substance being applied in admixture with a diluent in liquid form, which comprises supplying said liquid at a prescribed rate, corresponding to the prescribed rate of application of the substance, to an applicator system by which said liquid is applied to said travelling material, detecting any change in the amount of liquid in said applicator system which results from a deviation of the actual rate of application of the liquid from the prescribed rate of application thereof, utilizing such change to vary the effect of means acting directly on the travelling material to thereby affect the take-up of liquid by the material in a sense and to an extent substantially to correct said deviation, detecting relatively long term variation of the effect of said direct-acting means from a datum, and utilizing any such departure to alter the concentration of said substance in the liquid to thereby affect the rate of take up thereof required by the material in a sense and to an extent substantially to eliminate said departure.

2. A method as claimed in claim 1 wherein varying the effect of said direct-acting means involves altering the pressure between a pair of nip rollers between which the material passes, and detecting variation of the effect of said direct-acting means involves detecting relatively long term departure of said nip pressure from a datum.

3. Apparatus for continuously applying a prescribed amount of a substance per unit length of a travelling material, said substance being applied in admixture with a diluent in liquid form, which comprises, in combination, an applicator system by which said liquid is appleid to said travelling material, said system including means for acting directly on the travelling material, means for supplying said liquid at a prescribed rate, corresponding to the prescribed rate of application of the substance, to said applicator system, means for detecting any change in the amount of liquid in said applicator system which results from a deviation of the actual rate of application of the liquid from the prescribed rate of application thereof, means for utilizing such change to vary the effect of said direct-acting means to thereby affect the take-up of liquid by the material in a sense and to an extent substantially to correct said deviation, means for detecting relatively long term departure of the action of said direct-acting means from a datum, and means for utilizing any such departure to alter the concentration of said substance in the liquid to thereby effect the rate of take-up thereof required by the material in a sense and to an extent substantially to eliminate said departure.

4. Apparatus as claimed in claim 3 wherein said direct-acting means includes a pair of nip rollers between which the material passes, said utilizing means serving to alter the pressure between said rollers, and said detecting means being sensitive to the nip pressure between said rollers.

5. Apparatus as claimed in claim 3 in which said liquid is supplied to said applicator system by variable through-put pump means.

6. Apparatus as claimed in claim 4 in which said applicator system consists of a pad box for said liquid, a control box of substantially lesser volume than said pad box, a weir connecting said pad box and said control box, a pump for continuously circulating liquid supplied to said system from said control box to said pad box from which it continuously returns to the control box over said weir, and a series of rollers and mangle bowls including said nip rollers by which said material is progressed through said pad box and by which excess liquor is expressed therefrom.

7. Apparatus as claimed in claim 6 in which said roller and mangle bowl system includes means for urging one said nip rollers against the other with variable pressure dependent upon the amount of liquid in the applicator system.

8. Apparatus as claimed in claim 7 in which a float is disposed in said control box and is adapted to control said means for urging said one nip roller against the other in such manner that the pressure at the nip between said bowls is increased if the liquid level in the control box falls due to increase in take-up of liquid by said material and is decreased if said liquid level rises due to decrease in take-up of liquid by said material.

9. Apparatus as claimed in claim 8 in which said float is at one end of a lever the movement of the other end of which controls the pressure exerted between said rollers.

10. Apparatus as claimed in claim 9 in which the cross-sectional shape of said float along the length thereof is such as to provide an approximately linear relationship between the volume of liquid in the control box and the take-up imposed by the controlling nip.

11. Apparatus as claimed in claim 3 in which the liquid supplying means includes a source of stock liquor of given strength, a source of diluent, and means for supplying a mixture thereof.

12. Apparatus as claimed in claim 11 comprising an adjustable throughput pump by which the rate of feed of said stock liquor is set according to the desired rate of application of said substance to the material, and an adjustable throughput pump by which the amount of diluent fed to said stock liquor may be varied.

13. Apparatus as claimed in claim 12 in which the diluent pump is under the control of means from said datum so that the concentration of said liquid is varied in such a manner as substantially to eliminate said departure.

References Cited

UNITED STATES PATENTS 2,522,900   9/1950   Schmitt.

FOREIGN PATENTS 907,529   10/1962   Great Britain.

ALFRED L. LEAVITT, *Primary Examiner.*

CHARLES R. WILSON, *Assistant Examiner.*

U.S. Cl. X.R.

18—8; 57—140; 161—181; 264—177